March 26, 1968   K. HANNERZ   3,375,171
BOILING HEAVY WATER REACTOR
Filed Oct. 12, 1965
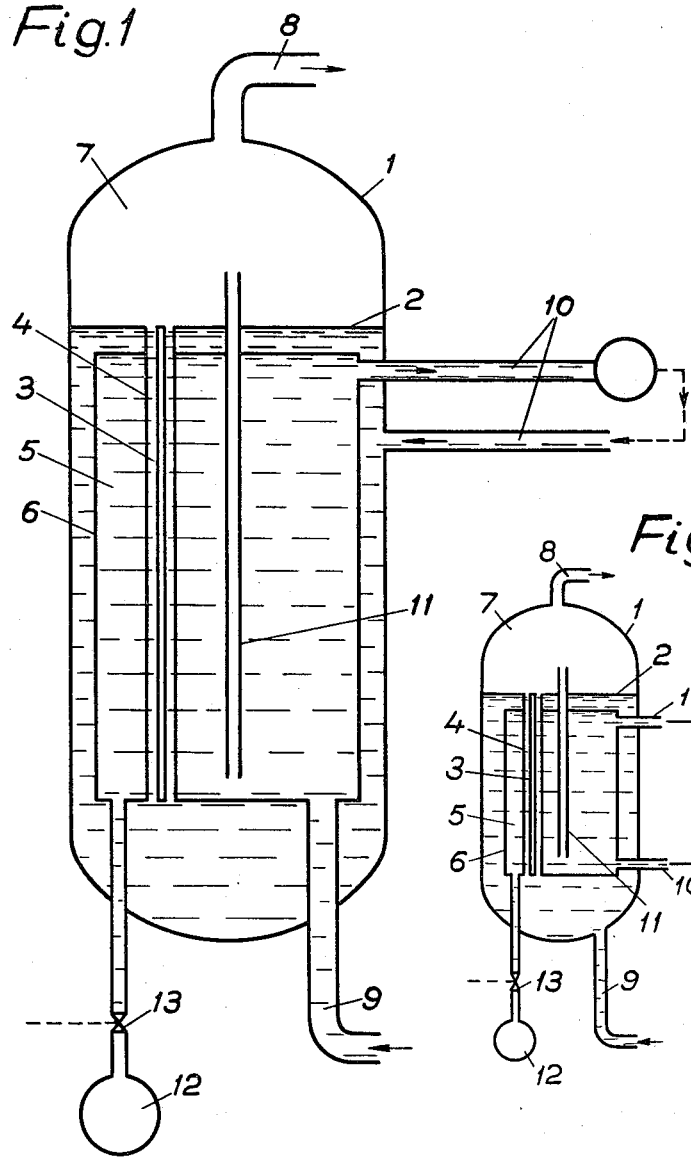
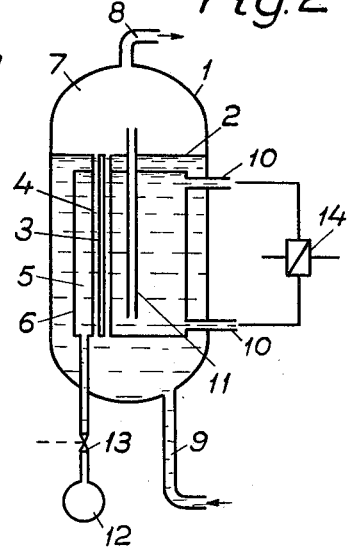
INVENTOR.
KÅRE HANNERZ
BY
Bailey, Stephens + Huettig
Attorneys United States Patent Office
3,375,171
Patented Mar. 26, 1968

3,375,171
BOILING HEAVY WATER REACTOR
Kare Hannerz, Vasteras, Sweden, assignor to Allmanna Svenska Elektriska Aktiebolaget, Vasteras, Sweden, a corporation of Sweden
Filed Oct. 12, 1965, Ser. No. 495,129
Claims priority, application Sweden, Oct. 23, 1964, 12,768/64
5 Claims. (Cl. 176—54)

ABSTRACT OF THE DISCLOSURE

A boiling heavy water reactor having a submerged, pressure regulated, separate moderator tank provided with a plurality of tubes extending from the inside of the moderator tank into a steam space of the reactor above the tank. These tubes can, after a fast shutdown of the reactor, provided that the pressure in the moderator tank is reduced, lead the heavy water steam formed by the residual power into the cooler liquid moderator, where the steam will be condensed.

---

The present invention relates to a nuclear reactor with boiling heavy water as the working medium and a separate moderator tank.

In the event of breakdowns, a nuclear reactor must be able to be very quickly shutdown. In conventional reactors this is done by inserting a number of control rods of neutron absorbing material in the reactor core.

Upon a quick shutdown the escape of steam from the reactor must usually be completely interrupted. However, the heat capacity of the reactor prevents the steam generation from being made to cease instantaneously. It has therefore been necessary to arrange large dumping tanks for the steam which is generated by the residual effect of the reactor during quick shutdown.

The object of the present invention is to provide a reactor construction which upon a quick shutdown is not dependent on the function of the control rods and control devices and does not require large and expensive dumping tanks for the blowing out of steam. The invention is characterised in that the moderator tank mentioned in the first paragraph communicates with the evaporated working medium through a number of tubes and is connected to a pressure regulating system for reducing the pressure in the tank. The invention entails upon a quick shutdown of the reactor, causing several effect-reducing factors to cooperate in a simple way. When the pressure is reduced in the moderator tank, the heavy water steam flows into the moderator space through the said tubes and thereby reduces the reactivity of the reactor, since the steam in the tubes has considerably less density than the moderator water and therefore cannot brake the speed of the neutrons in the same way as the moderator. Upon a sufficiently large reduction of the pressure in the moderator, the steam flows through the tubes and is condensed in the moderator water which is supercooled, that is has a temperature which is lower than the boiling point. By this means the heat from the steam is transferred to the moderator water, whose temperature rises. A higher temperature in the moderator means a reactivity loss in the reactor and a temperature increase thus contributes to lower the effect of the reactor. Simultaneously the moderator tank acts as a dumping tank for the steam. The relatively large volume of the moderator and its comparatively low temperature means that the steam which is formed by the residual effect of the reactor can easily be absorbed in the moderator tank.

The pressure reduction in the moderator tank is most simply effected by connecting through a valve a small discharge tank to the moderator tank. The moderator tank can be made of a separately cooled closed unit or the working medium can be brought to circulate through the moderator tank, controlled by a separate pump system. This pump system must, of course, cooperate with the pressure regulating system when the pressure is to be lowered in the moderator tank.

The invention will in the following be described more fully with reference to the accompanying figures, of which FIGURE 1 shows schematically a section through one embodiment of a reactor according to the invention and FIGURE 2 shows a section of another embodiment of a reactor according to the invention.

In the figures the numeral 1 denotes the pressure vessel of the reactor which under normal operation is filled with heavy water to the level 2. In the reactor there is a number of fuel assemblies 3 surrounded by water conducting tubes 4, which in their turn are surrounded by the moderator 5 which also consists of heavy water and which is enclosed in a moderator tank 6. The working medium flows through the tubes 4 and is heated by the fuel assembly 3 to the boiling point. In the upper part of the reactor there is a space 7 for the steam generated which is led through an outlet 8 to a turbine plant or the like (not shown). From the turbine plant the working medium is repumped in liquid form and at a relatively low temperature through the feed pipe 9 and flows through this to the moderator tank 6. From the moderator tank the water is taken through a pump system 10 which can comprise a number of units not shown in detail, such as valves, heat exchangers, etc. The pump system helps to determine the pressure in the moderator tank. From the pump system the water is taken after preheating to a suitable temperature to the space in the reactor outside the moderator tank.

The moderator tank 6 is connected to the steam space 7 by a plurality of tubes 11, which extend up above the level of the water 2 and open out near the bottom of the reactor tank. A discharge tank 12 is also connected to the moderator tank and between this tank and the moderator tank there is a stop valve 13 which can be operated from a pressure regulating system for the moderator tank which is arranged to simultaneously influence the valve 13 and the pump circuit 10 for regulating the pressure in the moderator tank. By simultaneously opening the valve 13 and closing the pump circuit 10, a part of the moderator water is discharged into the tank 12 and a quick pressure drop is produced in the moderator tank. The pressure drop causes the steam pressure in the space 7 to displace the water in the tubes 11, so that the heavy water steam flows into the moderator and is condensed in the moderator water which has a relatively low temperature. The effect of the reactor is then reduced quickly partly because the water in the tubes 11 is replaced by steam, partly because the steam raises the temperature of the moderator water during the condensation. At the same time the steam pressure in the reactor is reduced. The discharge tank 12 can have a small volume, since a considerable lowering of pressure is achieved through the drainage of relatively small quantities of liquid.

Instead of allowing the working medium to circulate through the moderator as is shown in FIGURE 1, the working medium from the return pipe 9 can be taken directly into the outer space of the reactor as shown in FIG. 2. The moderator can then be made of a closed separate unit with its own temperature regulating system 14.

The invention is not limited to the embodiment shown, but several variations and modifications are feasible within the scope of the following claims.

I claim:
1. A boiling heavy water reactor including a container partially filled with heavy water to a certain level, a plurality of fuel assemblies, heavy water conducting tubes around said fuel assemblies, a moderator tank within said container, a liquid moderator in said moderator tank around said tubes, a steam space in said container above the level of said heavy water, means responsive to a fast shutdown and effective to reduce the residual power of the reactor, said means including a plurality of open tube members extending from said steam space into said moderator tank and a pressure regulating system connected to said moderator tank for reducing the pressure in said tank.

2. In a boiling heavy water reactor according to claim 1, said pressure regulating system including a dump tank.

3. In a boiling heavy water reactor according to claim 1, said heavy water constituting said liquid moderator, a pump system for circulating said heavy water.

4. In a boiling heavy water reactor according to claim 1, a closed circulating system connected to said moderator tank and provided with temperature regulating means.

5. In a boiling heavy water reactor according to claim 1, said open tube members having one end located near the bottom of said moderator tank.

References Cited
UNITED STATES PATENTS

| | | | |
|---|---|---|---|
| 2,999,059 | 9/1961 | Treshow | 176—42 |
| 3,150,053 | 9/1964 | Goldman et al. | 176—54 |
| 3,174,907 | 3/1965 | Bradley | 176—54 |
| 3,284,307 | 11/1966 | Schortmann | 176—54 |
| 3,284,311 | 11/1966 | McHugh | 176—54 |

L. DEWAYNE RUTLEDGE, *Primary Examiner.*